United States Patent [19]

Somberg

[11] 4,239,476
[45] Dec. 16, 1980

[54] MOLD FOR PRODUCING MOLDINGS FROM A PLASTIC COMPOUND

[76] Inventor: Hans F. Somberg, S-123 57, Farsta, Sweden

[21] Appl. No.: 81,160

[22] Filed: Oct. 2, 1979

[30] Foreign Application Priority Data

Oct. 3, 1978 [SE] Sweden ............................. 7810352

[51] Int. Cl.² ............................................ B29F 1/00
[52] U.S. Cl. .................................... 425/556; 425/572
[58] Field of Search ............... 249/63; 425/556, 572, 425/588, DIG. 51

[56] References Cited

U.S. PATENT DOCUMENTS

| | | | |
|---|---|---|---|
| 2,571,766 | 10/1951 | Saulino | 425/556 |
| 2,876,495 | 3/1959 | Spillman | 249/63 X |
| 3,843,295 | 10/1974 | Greenberg | 425/572 X |
| 3,892,512 | 7/1975 | Diehl | 425/572 X |
| 3,989,436 | 11/1976 | McNeely et al. | 425/572 |
| 4,181,488 | 1/1980 | Grawey et al. | 425/572 X |

OTHER PUBLICATIONS

Plastics Mold Engineering Handbook; 3rd Ed., New York, N.Y.; DuBois, J. H. and Pribble, W. I.; 1978, pp. 384 & 385.

Primary Examiner—J. Howard Flint, Jr.
Attorney, Agent, or Firm—Hill, Van Santen, Steadman, Chiara & Simpson

[57] ABSTRACT

An injection mold for nonrigid plastic has separate mold cavities disposed on opposite sides of an intermediate mold part and fed from a common feed passage in one of a pair of outer mold parts defining the mold cavities jointly with the intermediate mold part. The intermediate mold part is divided along a plane transverse to the opening direction of the mold and its two halves are connected in accordion fashion with one another and respective ones of the outer mold parts. An extractor is disposed in the dividing plane and extends through a feed cavity which communicates with the feed channel and from which runner channels extend to the mold cavities. The feed cavity ensures a simultaneous distribution of the plastic compound to the mold cavities at both sides of the intermediate mold part upon injection, and when the mold is opened, the extractor pulls the moldings out of the mold cavities.

6 Claims, 6 Drawing Figures

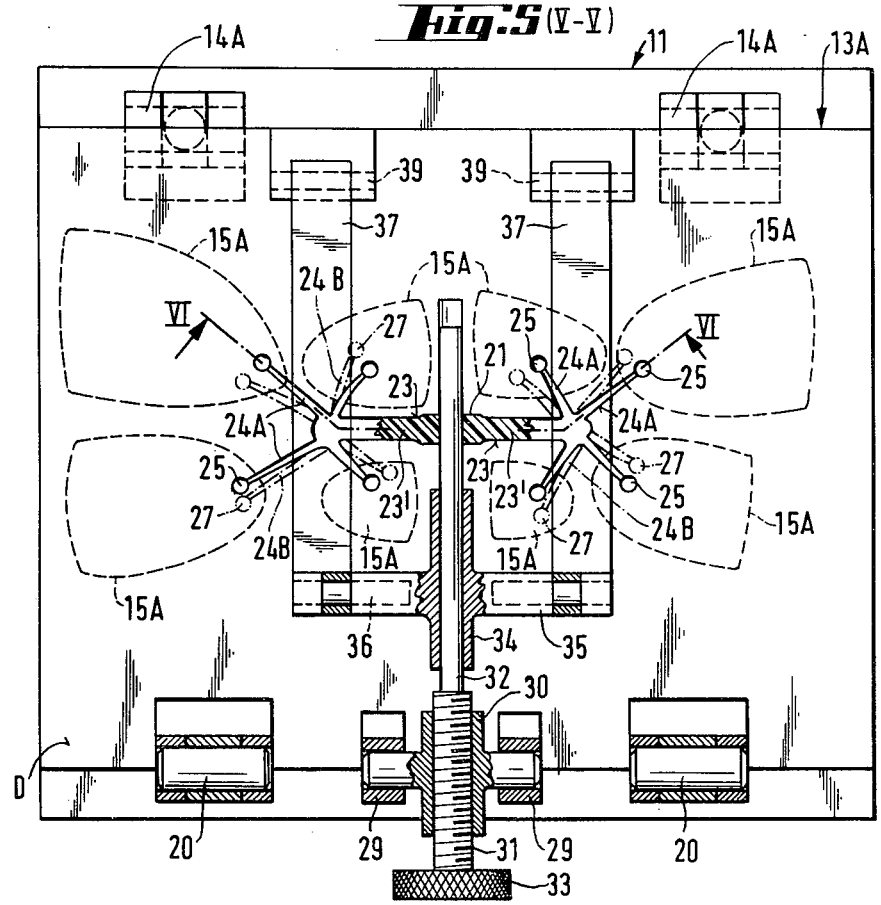
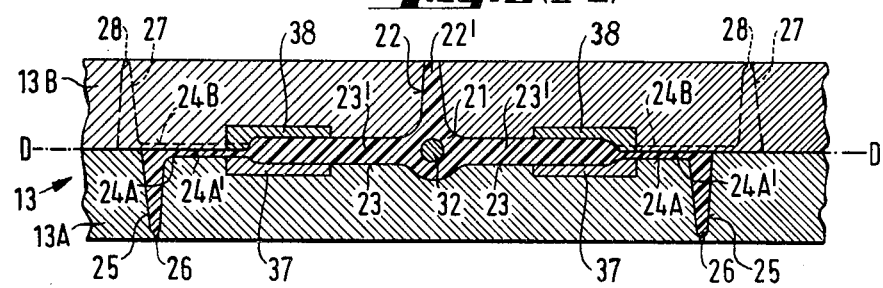

MOLD FOR PRODUCING MOLDINGS FROM A PLASTIC COMPOUND

BACKGROUND OF THE INVENTION

1. Field of the Invention

This invention relates to a mold for producing moldings from a plastic compound. More particularly, the invention relates to a mold of the kind commonly referred to as a stack, tandem, or two-level mold.

2. Prior Art

Molds of this kind, which are particularly suited for relatively thin moldings of large area, have mold cavities on opposite sides of an intermediate mold part and runner channels extending through the intermediate mold part to the mold cavities from a feed channel provided in one of a pair of outer mold parts which define the mold cavities jointly with the intermediate mold part.

An example of a known mold of this kind is described in Du Bois, J. H. and Pribble, W. I.: PLASTICS MOLD ENGINEERING HANDBOOK, 3rd Ed., New York, N.Y., 1978, pp. 384, 385. In known molds of the aforementioned kind it is often difficult to obtain a uniform quality of the moldings, because the plastic compound has a tendency to flow in an unbalanced manner to the two sides of the intermediate mold part during the charging of the mold. Thus, the mold cavity or group of mold cavities situated on the side of the intermediate mold part which is closest to the feed channel are not charged simultaneously with the mold cavity or group of mold cavities situated on the opposite side. Moreover, it is difficult to remove the scrap—the solidified plastic material which remains in the channel system of the mold after the charging has taken place and which is attached to the moldings in the mold cavities—from the mold upon opening thereof.

SUMMARY OF THE INVENTION

According to the invention a mold of the aforementioned kind is provided with an intermediate mold part having two mold part members disposed side by side on a mold axis. The mold part members are connected with one another and with respective ones of the outer mold parts for movement along the mold axis between a closed position, in which confronting faces of the mold part members engage one another and each outer mold part engages the adjacent mold part member, and an open position, in which the mold part members are spread apart from one another and from the outer mold parts. The confronting faces of the mold part members define a feed cavity and runner channel sections. In the closed position of the mold, the feed cavity communicates with the feed channel provided with one of the outer mold parts to receive the fluid plastic compound, and the runner channel sections extend from the feed cavity to the mold cavities to convey the plastic compound into the mold cavities. The mold also comprises an extractor mounted centrally of the mold part members for movement with respect thereto in a direction parallel to the mold axis. In the closed position of the mold, the extractor extends into the feed cavity so that it becomes surrounded by the plastic compound introduced into the mold through the feed channel.

The feed cavity formed within the intermediate mold part, from which the plastic compound is conveyed to the mold cavities on opposite sides of the intermediate mold part, provides for a balanced charging of the mold cavities and therefore provides for a uniform product quality. When the mold is opened, the central portion of the scrap piece is held by the extractor and as the mold part members are moving apart during the opening, the branches of the scrap piece formed in the runner channels are tensioned and finally break where they are connected to the moldings (where they are weakest). Before they break, they tend to pull the moldings out of the mold cavities which are predominantly formed in the outer mold parts. Therefore, separate ejector pins may often be dispensed with. In the preferred embodiment of the mold, the extractor is provided with means for automatically ejecting the scrap piece after the branches have broken.

It is therefore an object of the present invention to provide a stack mold readily permitting a balanced charging of the mold cavities.

Another object of the present invention is to provide a stack mold having simplified means for removing the moldings and the scrap piece from the mold.

Other advantages, features and additional objects of the present invention will become manifest to those versed in the art upon making reference to the detailed description and the accompanying drawings in which a preferred embodiment incorporating the principles of the present invention is shown by way of illustrative example.

BRIEF DESCRIPTION OF THE DRAWINGS

FIG. 5 is a side elevation of the mold as viewed from line V—V of FIG. 1;

FIG. 6 is a cross-sectional view along line VI—VI of FIG. 5.

DETAILED DESCRIPTION

Figure 1:
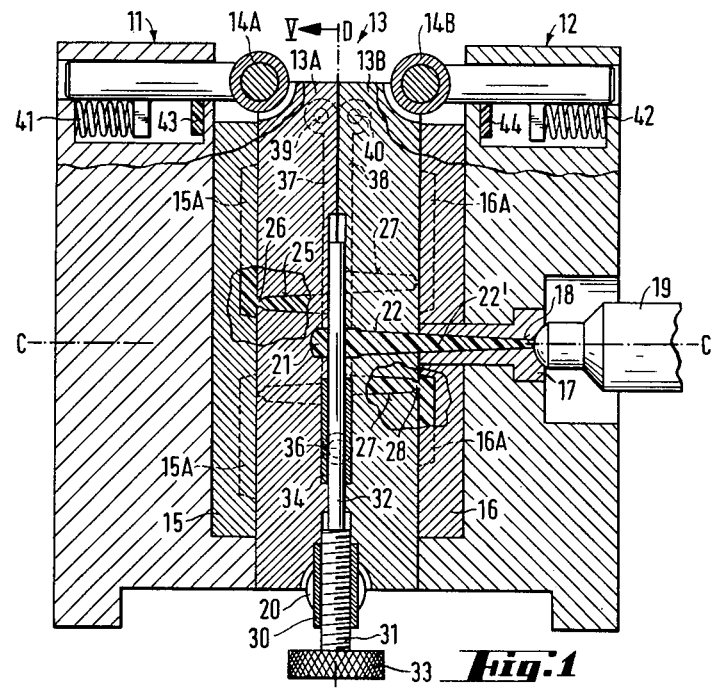
FIG. 1 is a horizontal cross-sectional view of an injection mold embodying the invention and shows the mold after completed injection but still closed.

The illustrated mold is an injection mold intended for the production of flat moldings (shoe-soles) of a non-rigid thermoplastic compound and has sixteen mold cavities which are divided into two groups, each comprising eight mold cavities. The mold cavities in each group are disposed in a common plane transverse to the horizontal mold axis C but the two groups are spaced along the mold axis.

The mold comprises three generally plate-like mold parts, namely, a first outer mold part 11, a second outer mold part 12, and an intermediate mold part 13 disposed between the two outer mold parts and coupled to these by a pair of hinges 14A,14B having vertical hinge axes. The second outer mold part 12 is adapted to be immovably mounted in the injection molding machine while the first outer mold part 11 is adapted to be rectilinearly moved relative to the second mold part 12 along the mold axis C between a closed position and an open position.

A mold cavity plate 15, which is secured to the side of the first outer mold part 11 facing the intermediate mold part 13, is formed with a number of mold cavities 15A of one of the mold cavity groups. A similar mold cavity plate 16 is secured to the side of the second outer mold part 12 facing the intermediate mold part 13 and is formed with a second group of mold cavities 16A. The second outer mold part 12 also has a feed bushing (sprue bushing) 17 disposed on the mold axis C and formed with an axial feed channel (sprue) 18 which widens conically towards the intermediate mold part 13 and opens into the side of the mold cavity plate 16 facing the intermediate mold part 13. A nozzle for injecting the fluid plastic compound through the bushing 17 is indicated at 19.

The intermediate mold part 13 comprises two substantially similar, generally plane-parallel, rectangular plate-like mold part members 13A and 13B. The two mold part members 13A,13B are hingedly interconnected along one vertical edge by means of a pair of hinges 20. Near the opposite vertical edge they are hingedly connected with respective ones of the outer mold parts 11 and 12 by means of the hinges 14A,14B. Thus, upon opening of the mold, the mold part members may be folded apart about the aligned vertical axes of the hinges 20, see FIGS. 3 and 4.

In the illustrated embodiment of the mold, the outer sides of the mold part members 13A,13B, i.e. the sides facing the adjacent outer mold part 11 or 12, are smooth and form walls of the mold cavities 15A and 16A when the mold is in the closed position as shown in FIG. 1. The confronting inner sides of the mold part members 13A,13B are also generally smooth except for a number of shallow recesses described hereinafter.

One of these recesses forms a feed cavity 21 which is centered in the plane, represented by a line D in FIG. 1, in which the inner sides of the mold part members 13A, 13B engage one another when the mold is in the closed position. This feed cavity 21 is disposed on the mold axis C at the mouth of a feed channel 22 passing through the mold part member 13B and constituting an extension of the feed channel 18 of the bushing 17.

From the feed cavity 21 two main runner channels 23—also formed by recesses in the confronting sides of the mold part members 13A,13B—extend laterally, that is, perpendicularly to the plane of FIGS. 1 to 4, see also FIG. 5. Adjacent their ends, the main runner channels 23 branch out into a first group of runner branch channels 24A, each of which extends to a runner channel end section 25 passing through the mold part member 13A. Each end section 25 opens into one of the mold cavities 15A in the mold cavity plate 15 by way of a restricted orifice 26, a so-called pin-point gate. A second group of runner branch channels 24B, which are shown in phantom lines in FIG. 5 and extend to the mold cavities 16A by way of runner channel end sections 27 and pin-point gates 28, are slightly offset in the plane D from the first group of branch channels 24A.

A pair of second hinges 29, which are mounted on the mold part members 13A,13B between and in alignment with the hinges 20 interconnecting the mold part members, support an internally screw-threaded sleeve 30. An externally screw-threaded section of an extractor rod 32 of circular cross-section and provided with a knob 33 is inserted in the sleeve. As shown in FIG. 5, the extractor rod is perpendicular to the vertical hinge axis and is mounted such that a cantilever end section of it extends through and beyond the feed cavity 21 in the closed mold.

The extractor rod 32 carries an axially displaceable sleeve 34. In the closed position of the mold, this sleeve is located between the screw-threaded section 31 and the portion of the extractor rod situated in the feed cavity 21. In this position, the extractor rod and the sleeve 34 have their axes positioned in the plane D and are received in spaces formed by elongated recesses of semi-circular cross-sections provided in the mold part members 13A,13B.

The sleeve 34 has a pair of transversely extending pins 35 and 36 constituting pivot pins for one end of two pairs of extractor links 37 and 38. The links 37 of one pair have their opposite end pivoted on a pair of pins 39 secured to the mold part member 13A adjacent the vertical edge thereof which is remote from the hinges 20. In similar manner, the links 38 of the other pair are pivoted on a pair of pins 40 secured to the mold part member 13B. In the closed position of the mold, the links 37 and 38 are received in shallow recesses in the mold part members 13A,13B with their confronting faces situated in the plane D. As shown in FIGS. 5 and 6, the main runner channels 23 and the branch channels 24A,24B are partly formed by elongated recesses extending across the confronting faces of the extractor links 37,38. Upon injection, the plastic compound will thus flow to the mold cavities along these recesses.

The hinges 14A,14B connecting the outer mold parts 11 and 12 with the mold part members 13A,13B are displaceable in a direction parallel to the mold axis C. A pair of compression springs 41,42 bias them in a direction away from the respective associated mold part 11,12. Their movement in that direction is limited by a pair of resilient abutments 43,44.

After the mold has been closed, the fluid plastic compound is injected from the nozzle 19 through the feed channels 18 and 22 into the feed cavity 21 from which the compound flows through the main runner channels 23, the runner branch channels 24A,24B, the runner channel end sections 25,27 and the gates 26,28 into the two groups of mold cavities 15A and 16A. See FIG. 1.

After completed injection, the solidified but resilient plastic compound fills all these cavities and recesses, and the portion of the compound confined between the outer end of the bushing 17 and the gates 26,28 form a unitary scrap piece which is later to be severed from the moldings and removed from the mold. This scrap piece comprises a stem contained in the feed channels 18 and 22. At the bulge which is confined in the feed cavity 21 and surrounds a portion of the extractor rod, the stem branches out into two main limbs confined in the main runner channels 23. At their outer ends, the main limbs of the scrap piece are further branched out into eight branches, each confined in one of the branch channels 24A,24B and the associated one of the end sections 25,27. As shown in FIGS. 5 and 6, a section of the main limbs and the branches is confined in the recesses formed in the confronting faces of the extractor limbs 37,38.

Figure 2:
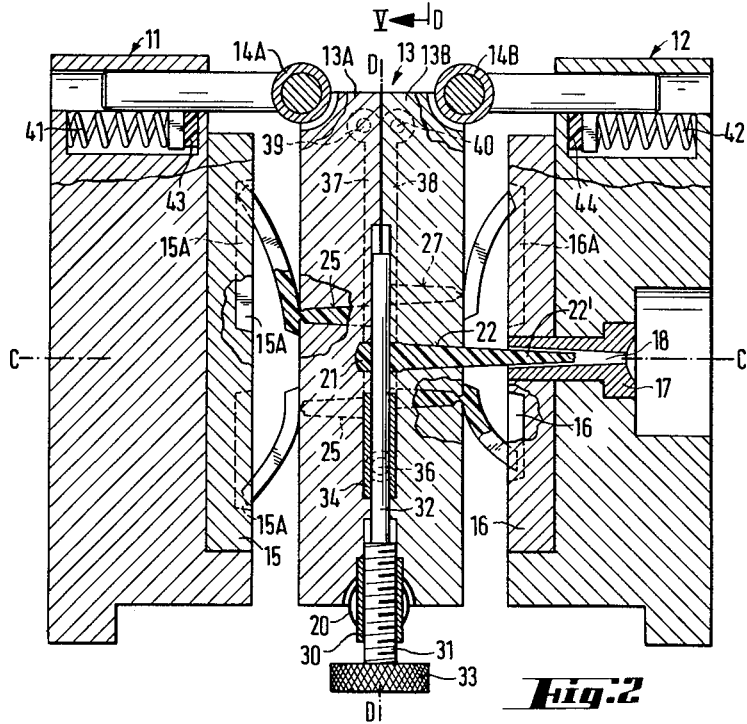
FIG. 2 is a cross-sectional view similar to FIG. 1 but shows an initial opening stage with the mold partly opened for degassing.

When the mold is opened by moving the mold part 11 away from the mold part 12 (to the left in FIGS. 1-4), a gap of even width is initially formed between each outer mold part 11,12 and the adjacent face of the two mold part members 13A,13B of the intermediate mold part 13. This gap effects to degassing of the mold cavities. The width of the gap is limited by the limitation of the movement of the hinges 14A,14B. Since the mold cavities are formed in the mold cavity plates 15,16, the moldings tend to remain in the mold cavities. However, because the moldings are still attached to the scrap piece in the intermediate mold part 13, the scrap piece at least partly pulls the moldings out of the mold cavities as the gaps are formed. This function is shown in FIG. 2. At the same time, the stem of the scrap piece is partly pulled out of the bushing 17 or at least tensioned so that it is pulled out as the mold is further opened.

Figure 3:
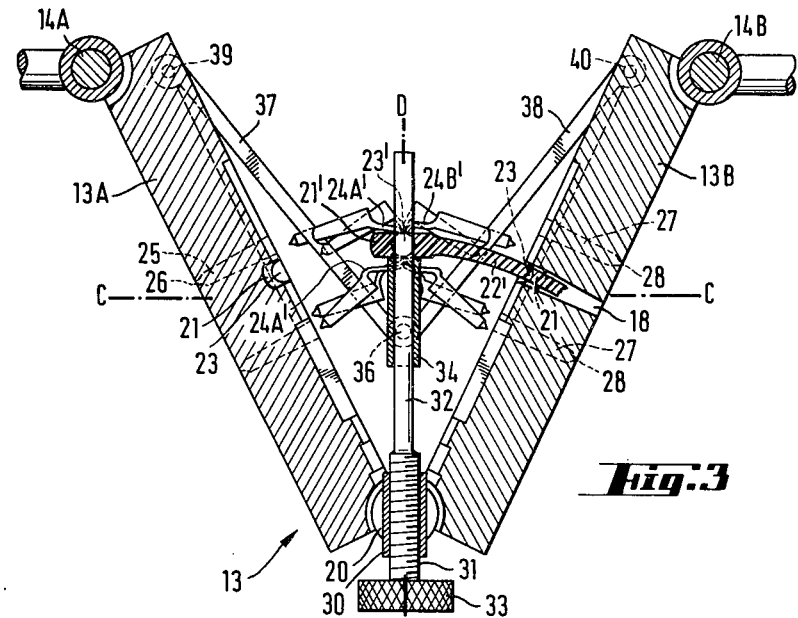
FIG. 3 is a cross-sectional view similar to FIGS. 1 and 2 with certain parts omitted and shows a subsequent opening stage with the connections of the moldings with the scrap piece just broken.
Figure 4:
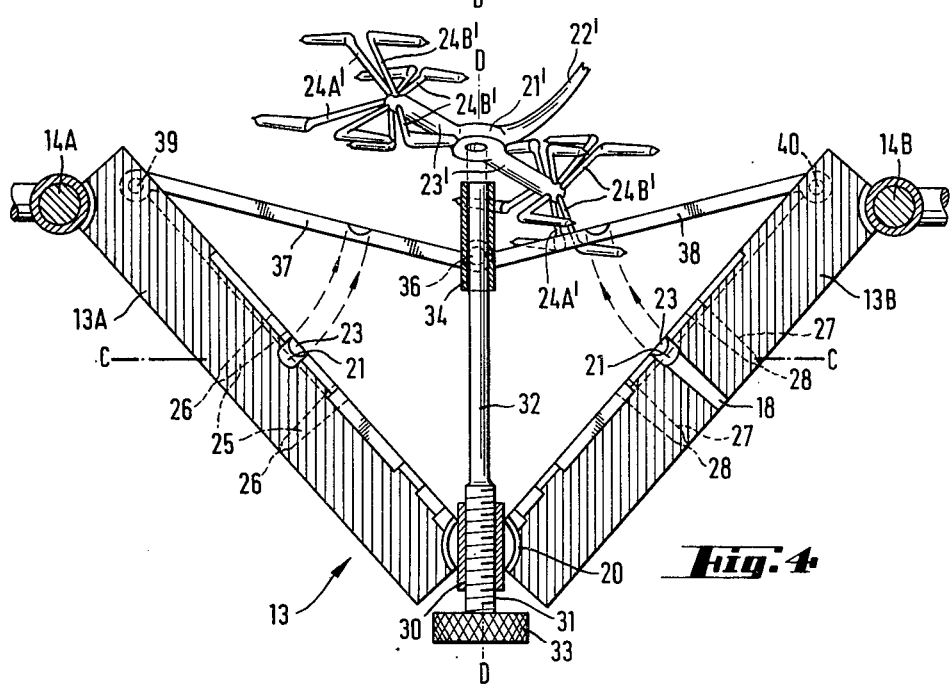
FIG. 4 is a cross-sectional view similar to FIG. 3 and shows a final stage in which the scrap piece is ejected from the extractor.

Upon continued opening movement, the mold part members 13A,13B are partly folded apart about the hinges 20, see FIG. 3 where the outer mold parts 11,12 are omitted. The symmetrical four-link linkage formed by the mold part members 13A,13B and the extractor links 37,38 maintains a symmetrical disposition of the mold part members between the outer mold parts 11,12 and retains the extractor rod 32 in the symmetry plane D.

As a result of the continued opening movement and the maintained symmetry, the moldings are completely pulled out of the mold cavities. Initially, they remain hanging on the mold part members 13A,13B. At the same time, the branches of the scrap piece, which also retains its symmetrical location, are tensioned and finally break at the gates 26,28 so that the moldings are freed and may be removed from the mold. See FIG. 3.

During the tensioning of the branches of the scrap piece, the extractor links 37,38 ensure that the branches are subjected to pulling action in a direction which is nearly aligned with the longitudinal direction of the runner channel end sections 25,27. This prevents oblique pulling of the branches and tearing them adjacent the ends of the runner channel end sections remote from the gates 26,28, rather than at the gates.

As the mold part members 13A,13B are gradually folded open about the hinges 20, the extractor links 37,38 also gradually displace the sleeve 34, and thus the scrap piece, on the extractor rod 32 towards the free end of the extractor rod. When the opening movement has progressed sufficiently, or the mold approaches the fully open position, the sleeve ejects the scrap piece from the free end of the extractor rod so that the scrap piece can drop from the mold, see FIG. 4 which shows the scrap piece with its stem 22', bulge 21', main limbs 23' and branches 24A',24B' at the moment it drops from the extractor rod 32. However, this takes place only after the mold part members have been folded apart sufficiently for all branches of the scrap piece to break and thus become severed from the moldings. By turning the extractor rod 32 the position of the free end of the extractor rod may be adjusted such that the scrap piece is ejected in an appropriate open position of the mold.

While the above-described embodiment, in which the mold parts and mold part members are coupled to one another in accordion fashion and the extractor rod is thus pivotally movable with respect to the mold part members in a direction parallel to the mold axis C, offers structural advantages and is therefore the preferred embodiment, it is within the scope of the invention to mount the mold parts and mold part members for movement in parallel relation along the mold axis, e.g. on guide bars parallel to the mold axis.

I claim as my invention:

1. A mold for producing moldings from a plastic compound, comprising
    an intermediate mold part having two mold part members disposed side by side on a mold axis,
    a pair of outer mold parts on opposite sides of the intermediate mold part, each outer mold part defining a mold cavity jointly with the adjacent face of the adjacent mold part member, one of the outer mold parts having a feed channel for the plastic compound,
    means mounting the outer and intermediate mold parts for relative movement of the outer mold parts and the mold part members along the mold axis between a closed position in which confronting faces of the mold part members engage one another and each outer mold part engages the adjacent one of the mold part members and an open position in which the mold part members are spread apart from one another and from the outer mold parts,
    means on said confronting faces of the mold part members defining a feed cavity, which in the closed position of the mold communicates with the feed channel of said one outer mold part, and sections of runner channels extending from the feed cavity to the mold cavities,
    an extractor positioned centrally of the mold part members, the extractor in the closed position of the mold extending into the feed cavity so as to become surrounded by the plastic compound introduced into the mold through the feed channel, and
    means mounting the extractor for movement with respect to the mold part members in a direction parallel to the mold axis.

2. A mold according to claim 1, said mold part members being hingedly interconnected on a first hinge axis transverse to the mold axis and hingedly connected to respective ones of the outer mold parts on a pair of second hinge axes parallel to the first hinge axis but spaced from it transversely of the mold axis.

3. A mold according to claim 2, each of the connections coupling the mold part members to the outer mold parts comprising a hinge providing an abutment-limited lost-motion in a direction parallel to the mold axis.

4. A mold according to claim 3, said hinge being spring-biassed such that the lost-motion takes place under the action of the spring-bias during opening of the mold.

5. A mold according to claim 1, said extractor being a rod extending in cantilever fashion transversely of the mold axis from a support on the mold part members and slidably carrying an ejector, and said intermediate mold part including a linkage coupling the ejector to the mold part members and operative in response to opening of the mold to displace the ejector towards the free end of the rod from a position between the support and the feed cavity.

6. A mold according to claim 5, said linkage comprising at least two links, each link having one end thereof hingedly connected to the ejector on a common hinge axis and having the other end thereof hingedly connected to respective ones of the mold part members, confronting faces of the links forming portions of said sections of runner channels.

* * * * *